United States Patent [19]

Graham

[11] Patent Number: 4,630,371
[45] Date of Patent: Dec. 23, 1986

[54] LINE TRIMMER SHIELD

[76] Inventor: Andrew J. Graham, R.F.D. 1, Box 323, Todd, N.C. 28684

[21] Appl. No.: 826,100

[22] Filed: Feb. 6, 1986

[51] Int. Cl.$^4$ ............................................. A01G 3/06
[52] U.S. Cl. ...................................... 30/347; 56/12.7
[58] Field of Search .................... 30/347, 276; 56/12.7

[56] References Cited

U.S. PATENT DOCUMENTS

| | | | |
|---|---|---|---|
| 4,047,299 | 9/1977 | Bair | 30/347 |
| 4,052,789 | 10/1977 | Ballas | 30/276 |
| 4,068,376 | 1/1978 | Briar | 30/276 |
| 4,200,978 | 5/1980 | Irelan et al. | 56/12.7 |
| 4,209,902 | 7/1980 | Moore et al. | 30/276 |
| 4,249,310 | 2/1981 | Secoura | 30/276 |
| 4,287,670 | 9/1981 | Baker | 30/276 |
| 4,426,780 | 1/1984 | Foster | 30/276 |

Primary Examiner—Jimmy C. Peters
Attorney, Agent, or Firm—Harvey B. Jacobson

[57] ABSTRACT

A radially short upstanding sleeve member is provided and includes an upper end releasably mounted from a rounded base portion of a sector-shaped debris shield of a line trimmer. The lower end of the sleeve member is loosely telescoped downwardly over the upper end of the line reel head of the line trimmer and an intermediate length portion of the sleeve member includes an inwardly projecting corrugation functioning to stiffen the sleeve member against radial deformity. In addition, the corrugation serves to allow lateral deflection of the lower end of the sleeve member relative to the upper end thereof and the corrugation projects closely inwardly over the upper end of the associated line reel head. Further, the upper end of the sleeve member is mounted from a depending flange portion of the base portion of a sector-shaped debris shield of the line trimmer through the utilization of a resilient spacing member.

8 Claims, 4 Drawing Figures

U.S. Patent  Dec. 23, 1986  4,630,371
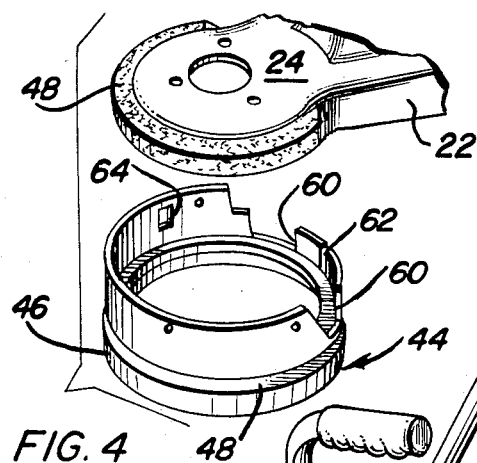

LINE TRIMMER SHIELD

BACKGROUND OF THE INVENTION

1. Field of the Invention

This invention relates to an axially short generally cylindrical shield stationarily mountable from the base portion of a debris shield of a line trimmer through which the output end of the drive shaft of the trimmer is journaled. The cylindrical shield is disposed in vertical position and the upper end of the line supporting rotary head of the trimmer is upwardly telescoped into the lower end of the cylindrical shield with the latter totally spanning the distance between the rotary head and the debris shield base portion in order to prevent entanglement of tall grass and/or weeds about the drive shaft end portion between the rotary head and the debris shield.

2. Description of Related Art

Various different forms of line trimmers heretofore have been provided with debris shields and/or tall grass and weed entanglement shields of at least minimum effectiveness, but in substantially all previous instances line trimmers equipped with sector-shaped debris shields have not also included stationary entanglement shields into which a line spool equipped rotary head of a line trimmer is at least partially telescoped in order to substantially eliminate any possibility of tall grass and/or weeds becoming entangled about the output end of the drive shaft of the line trimmer from which the rotary head is supported. Accordingly, a need exists for an improved form of entanglement shield for use in conjunction with a line trimmer of the type provided with a sector-shaped debris shield.

Examples of previously known forms of line trimmers including some of the general structural and operational features of the instant invention are disclosed in U.S. Pat. Nos. 4,047,299, 4,052,789, 4,068,376, 4,200,978, 4,209,902, 4,249,310, 4,287,670 and 4,426,780.

SUMMARY OF THE INVENTION

The entanglement shield of the instant invention is specifically designed for retrofitting existing line trimmers equipped with sector-shaped debris shields and for incorporation into newly constructed line trimmers having sector-shaped debris shields. More specifically, the entanglement shield of the instant invention is primarily concerned with line trimmers equipped with sector-shaped debris shields as well as rotary heads incorporating line spools therein of the "bumping" type including a lower end cap or abutment member which may be bumped upon the ground for releasing a predetermined length of line for feeding from the line spool during rotation of the head from which the spool is supported.

In addition, the entanglement shield is constructed in a manner whereby it may be readily adapted to various different forms of existing line trimmers as well as incorporated into the manufacture of new line trimmers.

The main object of this invention is to provide a grass and/or weed entanglement shield for line trimmers of the type provided with debris shields and wherein the entanglement shield is stationarily mounted from the debris shield and includes a general cylindrical lower end loosely downwardly telescoped over the rotary head of the line trimmer.

Another important object of this invention is to provide a grass and/or weed entanglement shield for a line trimmer constructed in a manner whereby it may be readily adapted for use in conjunction with various different makes and models of line trimmers.

Yet another object of this invention is to provide a line trimmer shield specifically designed to be used in conjunction with line trimmers of the type including rotary line supporting heads equipped with lower end caps or buttons which may be "bumped" upon the ground to release predetermined lengths of line from the rotary heads.

A final object of this invention to be specifically enumerated herein is to provide a line trimmer entanglement shield in accordance with the preceding objects and which will conform to conventional forms of manufacture, be of simple construction and easy to install so as to provide a device that will be economically feasible, longlasting and relatively troublefree in installation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of a conventional form of line trimmer equipped with a sector-shaped debris shield and with which the entanglement shield of the instant invention is operatively associated;

FIG. 2 is a fragmentary enlarged vertical sectional view taken substantially upon a plane passing through the central area of the lower portion of the apparatus illustrated in FIG. 1;

FIG. 3 is a bottom plan view of the assemblage illustrated in FIG. 2 with the rotary head of the line trimmer removed; and FIG. 4 is a fragmentary perspective view of the sector-shaped debris shield of the line trimmer illustrated in FIG. 1 and with the entanglement shield of the instant invention illustrated in exploded position relative thereto.

DESCRIPTION OF THE PREFERRED EMBODIMENTS

Referring now more specifically to the drawings the numeral 10 generally designates a conventional form of line trimmer including a power head 12 a tubular shank 14 extending downwardly from the power head 12. A power transmitting shaft is rotatably received within the support shank 14 and has a lower end 16 journaled from the lower end of the shank 14, the upper end of the power transmitting shaft being connected to the rotary output shaft (not shown) of the power head 12. Accordingly, upon operation of the power head 12 the lower end 16 of the power transmission shaft extending through the support shank or sleeve 14 is rotated about its longitudinal axis. A generally cylindrical body 18 is mounted on the lower end of 16 for rotation therewith and includes a radial bore 20 for purpose to be hereinafter set forth.

In addition, the line trimmer 10 includes a sector-shaped debris shield 22 including a circular base portion 24 supported from the lower end of the support shank 14 through the utilization of suitable fasteners 26, an inclined brace 28 being connected between the lower end of the support shank 14 and an outer portion of the debris shield 22.

A hollow rotary head 30 is removably screw threaded onto the lower end 16 below the cylindrical body 18 and includes an axially shiftable cap or button 32. The interior of the rotary head 30 mounts a line spool (not shown) therein and the head includes diametrically opposite radial openings 34 outwardly through which sections 36 of line extend. The cap or button 32 is yieldingly biased toward a lowermost position and may be upwardly displaced relative to the head 30 in order to release the line spool for rotation relative to the head 30 in order to outwardly feed predetermined lengths of the line sections 36 from the head 30 through the openings 34. During operation of the trimmer 10 the cap or button 32 is tapped or bumped upon the ground in order to feed additional lengths of line sections 36 from the head 30, as additional length sections of line are needed.

The base portion 24 of the debris shield 22 includes a depending skirt 40 extending thereabout and the skirt 40 includes a downwardly opening notch 42 formed therein through which a shank type tool may be inserted for engagement in the radial bore 20 in order to retain the cylindrical body, and thus the lower end 16, against rotation relative to the shield 22 while the head 30 is threaded from or threaded onto the lower terminal end of the lower end 16.

The foregoing comprises a description of a well-known conventional form of line trimmer.

The grass and/or weed entanglement shield of the instant invention is referred to in general by the reference numeral 44 and comprises an axially short generally cylindrical sleeve member 46 disposed in upstanding position and including a mid-height circumferential corrugation 48. The sleeve member 46 is constructed of plastic and the corrugation 48 is provided to stiffen the sleeve member 46 against radial deformity while allowing lateral deflection of the sleeve member lower end. Further, the corrugation 48 closely overlies the outer periphery of the upper end of the head 30 and thus further serves to prevent tall grass and/or weeds from winding about the lower end 16.

The upper end of the sleeve member 46 is loosely telescoped over the depending skirt 44 and supported therefrom through the utilization of an arcuate resilient spacing member 48 extending about the base portion 24 and secured thereto through the utilization of threaded fasteners 50. The upper end of the sleeve member 46 is telescoped over the spacing member 48 and removably anchored thereto through the utilization of threaded fasteners 52, see FIG. 3.

The outwardly projecting portion of the debris shield 22 includes pairs of opposite side depending stiffening flanges 54 and 56 as well as a central depending stiffening flange 58 and the upper end of the sleeve member 46 is provided with upwardly opening wide notches 60 for receiving the pairs of flanges 54 and 56 therethrough as well as a narrow notch 62 for receiving the stiffening flange 58 therethrough. Also, the upper end of the sleeve member 46 includes a window 64 therein registered with the notch 42, see FIG. 4, and through which a shank type tool may be inserted for engagement in the radial bore 20 for the purpose hereinbefore set forth.

The lower end of the sleeve member 46 is loosely downwardly telescoped over the upper end of the rotary head 30 to a height spaced slightly above the plane in which the openings 34 swing and the sleeve member 46 thereby substantially positively prevents any entanglement of tall grass and/or weeds about any portion of the lower end 16 between the rotary head 30 and the cylindrical body 18.

By maintaining the upper and lower ends of the sleeve member 46 of the same diameter, ease of manufacture is obtained and different radial thickness spacing members 48 may be used between the upper end of the member 46 and the depending skirt portions of debris shield base portions of different radii of curvature. Accordingly, the member 46 is adaptable to different size debris shield base portions. In addition, mounting the member 46 from the depending skirt 40 through the utilization of a resilient spacing strip member 48 cushions the mounting of the member 46 from the skirt 44 and thereby enables the plastic member 46 to absorb considerable lateral impacts. Also, by utilizing a plastic member 46, the requisite notches 60 and 62 may be readily formed by the ultimate purchaser of the member 46 for retrofitting an existing line trimmer.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In combination with a line trimmer head assembly including a sector-shaped debris shield radiating outward therefrom and wherein the apex end portion of the shield terminates in a rounded base portion having a central aperture formed therethrough and secured to the underside of the head with a line reel mounting shaft end portion extending downwardly from the head, projecting through the aperture and having a "bumping" type line release line reel head mounted thereon beneath said rounded base portion, a tall grass and/or weed entanglement shield comprising an upright axially short sleeve member including an upper end extending about and mounted from the outer periphery of said base portion, said upper end including upwardly opening peripherally spaced notch means formed therein registered with, providing clearance for and receiving adjacent portions of the apex portion of said debris shield therein, said sleeve member including a lower end projecting downward from said debris shield and loosely telescopingly engaged over the upper portion of said line reel head.

2. The assembly of claim 1 wherein said rounded base portion includes a depending peripheral flange extending thereabout from one side of the apex portion of said debris shield to the other, said upper end of said sleeve, exclusive of the notched portions thereof, being telescoped upwardly over said peripheral flange and secured thereto.

3. The assembly of claim 2 including a resilient strip-type spacing member disposed between the inner and outer surfaces of the telescopingly engaged portions of said sleeve member upper end and said peripheral flange.

4. The assembly of claim 2 wherein said debris shield includes depending stiffening flange means extending along paths extending between the major and minor dimension ends of said debris shield and joined to said base portion, said notch means including individually upwardly opening notches formed in said upper end receiving said stiffening flanges therethrough.

5. The assembly of claim 2 wherein said flange includes a radial locking pin receiving notch formed in the lower end thereof, said upper end including a radial opening formed therethrough aligned with said locking pin receiving notch.

6. The assembly of claim 5 including a resilient strip-type spacing member disposed between the inner and outer surfaces of the telescopingly engaged portions of said sleeve member upper end and said peripheral flange.

7. The assembly of claim 6 wherein said debris shield includes depending stiffening flange means extending along paths extending between the major and minor dimension ends of said debris shield and joined to said base portion, said notch means including individually upwardly opening notches formed in said upper end receiving said stiffening flanges therethrough.

8. The assembly of claim 1 wherein said sleeve member includes a mid-length circumferentially extending inwardly projecting corrugation formed therein spaced below said base portion.

* * * * *